United States Patent [19]

Clark et al.

[11] 4,197,266

[45] Apr. 8, 1980

[54] METHOD FOR FORMING OPTICAL LENSES

[75] Inventors: James A. Clark, Honeoye Falls; Donald V. Livesey; Richard J. Wrue, both of Rochester, all of N.Y.

[73] Assignee: Bausch & Lomb Incorporated, Rochester, N.Y.

[21] Appl. No.: 853,701

[22] Filed: Nov. 21, 1977

Related U.S. Application Data

[60]. Division of Ser. No. 762,221, Jan. 27, 1977, Pat. No. 4,113,224, which is a continuation-in-part of Ser. No. 564,403, Apr. 8, 1975, abandoned, and Ser. No. 693,402, Jun. 7, 1976, abandoned, said Ser. No. 693,402, is a division of Ser. No. 564,403, , which is a continuation-in-part of Ser. No. 466,933, May 6, 1974, abandoned.

[51] Int. Cl.$^2$ .............................................. B29D 11/00
[52] U.S. Cl. .......................................... 264/1; 264/25
[58] Field of Search ............................. 264/1; 425/808

[56] References Cited

U.S. PATENT DOCUMENTS

| | | | |
|---|---|---|---|
| 2,525,664 | 10/1950 | Gadsby et al. | 264/22 |
| 2,728,106 | 12/1955 | Herman et al. | |
| 3,361,858 | 1/1968 | Wichterle | 264/1 |
| 3,408,429 | 10/1968 | Wichterle | 264/1 |
| 3,460,928 | 8/1969 | Cosko | 264/1 |
| 3,902,693 | 9/1975 | Crandon et al. | 425/808 |

FOREIGN PATENT DOCUMENTS

| | | | |
|---|---|---|---|
| 1945321 | 3/1971 | Fed. Rep. of Germany | 264/1 |
| 1193422 | 11/1959 | France | 264/1 |
| 847797 | 9/1960 | United Kingdom | 264/1 |

Primary Examiner—James B. Lowe
Attorney, Agent, or Firm—Frank C. Parker; DeWitt M. Morgan

[57] ABSTRACT

Apparatus for and method of forming ophthalmic lenses and/or semi-finished lens blanks including those of the eye contact type. The apparatus includes molds having cooperating first and second members each of which includes a longitudinal axis and a mold surface which is symmetrical with respect to such axis. In one embodiment these mold members or halves also include cooperating surfaces which, in operation and in cooperation with the selected lens material, both align the respective mold axes and axially position the mold surface of the first member with respect to the mold surface of the second member to thereby form the desired lens mold cavity. Further, each of the assembled molds also includes an annular reservoir which surrounds the mold cavity and is defined by surfaces provided on the first and second mold members. This reservoir is connected to the mold cavity via an annular restriction. In one embodiment this restriction is defined by the cooperating aligning surfaces provided on the first and second mold members.

In operation, the reservoir holds a volume of lens material which, during the polymer forming reaction, is kept in a flowable state longer than the lens material in the mold cavity. This arrangement permits the transfer of lens material between the reservoir and the mold cavity during curing. Apparatus is also provided for removing selected portions of the cast lens in those instances where removal is either necessary or expedient.

5 Claims, 10 Drawing Figures

METHOD FOR FORMING OPTICAL LENSES

CROSS REFERENCE TO RELATED APPLICATION

This application is a division of application Ser. No. 762,221 (now U.S. Pat. No. 4,113,224) filed Jan. 27, 1977. Application Ser. No. 762,221 is, in turn, a continuation-in-part of both application Ser. No. 564,403 filed Apr. 8, 1975 (now abandoned), and application Ser. No. 693,402 filed June 7, 1976 (now abandoned). Application Ser. No. 693,402 is a division of application Ser. No. 564,403. Application Ser. No. 564,403 is a continuation in part of application Ser. No. 466,933 filed May 6, 1974 (now abandoned).

DESCRIPTION OF THE PRIOR ART

Ophthalmic lenses, including those of the eye contact type may be made from a variety of suitable materials. Such materials include selected polymerizable monomers, polymerizable oligomers, polymerizable prepolymers and cross-linkable polymers.

A series of cross-linked hydrophilic polymers formed by the polymerization of selected monomers is disclosed in U.S. Pat. Nos. 2,976,576 and 3,220,960. Articles made from such polymers have the appearance of an elastic and pliable hydrogel and may be transparent. These articles, in their hydrated condition, are elastically deformable under relatively small pressure but virtually immune to plastic deformation. When the aqueous constituent of such hydrogels is of a composition similar or analogous to that of physiological saline solution these materials have been found to be compatible with human body tissue for extended periods of time. Accordingly, such hydrogels have been formed into objects, such as contact lenses.

U.S. Pat. No. 3,361,858 discloses a method and apparatus for making contact lenses from a "xerogel" which is, generally speaking, a hard material that is converted to a hydrogel by the absorption of water. In one method a cylindrical tube and a coaxially received plunger member are used to form a lens blank. After polymerization, the cylindrical tube is removed leaving a "xerogel" blank firmly adhering to the plunger member. This blank is then machined, ground and polished while it is rotated about the plunger axis. In an alternate method a lens is formed by injecting polymerizable material into a cavity defined by the spherical surface formed on the end of a rod and a membrane of soft rubber.

In U.S. Pat. No. 3,408,429 there is disclosed a method of manufacturing contact lenses of cross-linked hydrophilic polymers of the type disclosed in U.S. Pat. Nos. 2,976,576 and 3,220,960. The method is performed by polymerization of the selected monomers in a mold rotating about its own central axis. Rotation is fast enough to centrifugally drive the initially liquid material to the periphery of the mold to form a lens of the desired configuration. The optical power of the lens manufactured according to this process is determined by such factors as the shape and size of the mold, the speed of rotation of the mold during polymerization, inclination of the axis of rotation relative to the mold axis and the density of the polymerizable monomer.

A method and apparatus for producing cast optical elements by photopolymerization of monomeric material is disclosed in U.S. Pat. No. 2,524,862. The apparatus disclosed includes first and second mold members which are separated from each other by a gasket and held in assembled relationship by a series of clamps. The apparatus also includes a source of light. According to the process, the thicker sections of the lens to be cast should receive more light during the polymer forming reaction than the thinner sections of such lens so that polymerization takes place more rapidly in the center assuming that the center is thicker) than at the edges. This, it is stated allows the polymerizable liquid to be drawn from the edges of the mold as the shrinkage which accompanies polymerization proceeds, thereby preventing the formation of voids and internal strains in the casting. To assure that the thickest section receives more light, an opaque screen having a cut out of the desired shape is interposed between the mold and the source of radiation. As this cut out is not symmetrical, apparatus for providing continuous relative rotation between the screen and the assembled mold is provided. U.S. Pat. No. 2,525,664 covers improvements relating to the screen described in U.S. Pat. No. 2,524,862.

Lenses made of polymerizable monomers such as allyl diglycol carbonate, diallyl phthalate and allyl chloroacrylate are disclosed in U.S. Pat. No. 3,222,432. Lenses of such material are formed by polymerizing the constituent materials between two mold halves which are made of quenched glass having a uniform thickness and which are urged towards each other by a resilient clamping device. Such design permits, during the polymer forming reaction, the mold halves to follow and conform to any shrinkage variations in the lens material without any separation or breakaway between the mold wall and the lens material and without the high clamping pressure required by the prior art.

In recent years silicone rubber has also been suggested as a substitute for such material as methyl-methacrylate in the preparation of, for instance, contact lenses. Lenses of such material are disclosed in U.S. Pat. Nos. 3,228,741 and 3,518,324.

With materials such as those discussed above, material shrinkage during the curing of the lens is present. Even when this shrinkage is very small is presents difficulties in the casting of lenses. Maintaining mold halves in their proper orientation and spacing when using a lens material which expands would present similar problems.

SUMMARY OF THE INVENTION

Method of forming lenses and/or semi-finished lens blanks.

In operation, the lens material is deposited on the surface of one of the mold members. The second mold member is then moved into position relative to the first mold member to: (1) form the mold cavity; (2) fill the mold cavity with a portion of the lens material; (3) axially align the mold surfaces to determine lens thickness; (4) align the mold axes to control lens prism; and (5) load the reservoir with the remaining portion of the lens material. The lens material is then polymerized proceeding outward from the center section of the mold cavity. During this polymer forming reaction the lens material in the reservoir is kept in a flowable state longer than the lens material in the mold cavity to permit the transfer of lens material between the reservoir and the mold cavity during curing.

In those instances where the casting is a semifinished lens, or where otherwise expedient, a method of removing selected portions of the lens material is also provided.

DESCRIPTION OF THE PREFERRED EMBODIMENT

Figure 1:
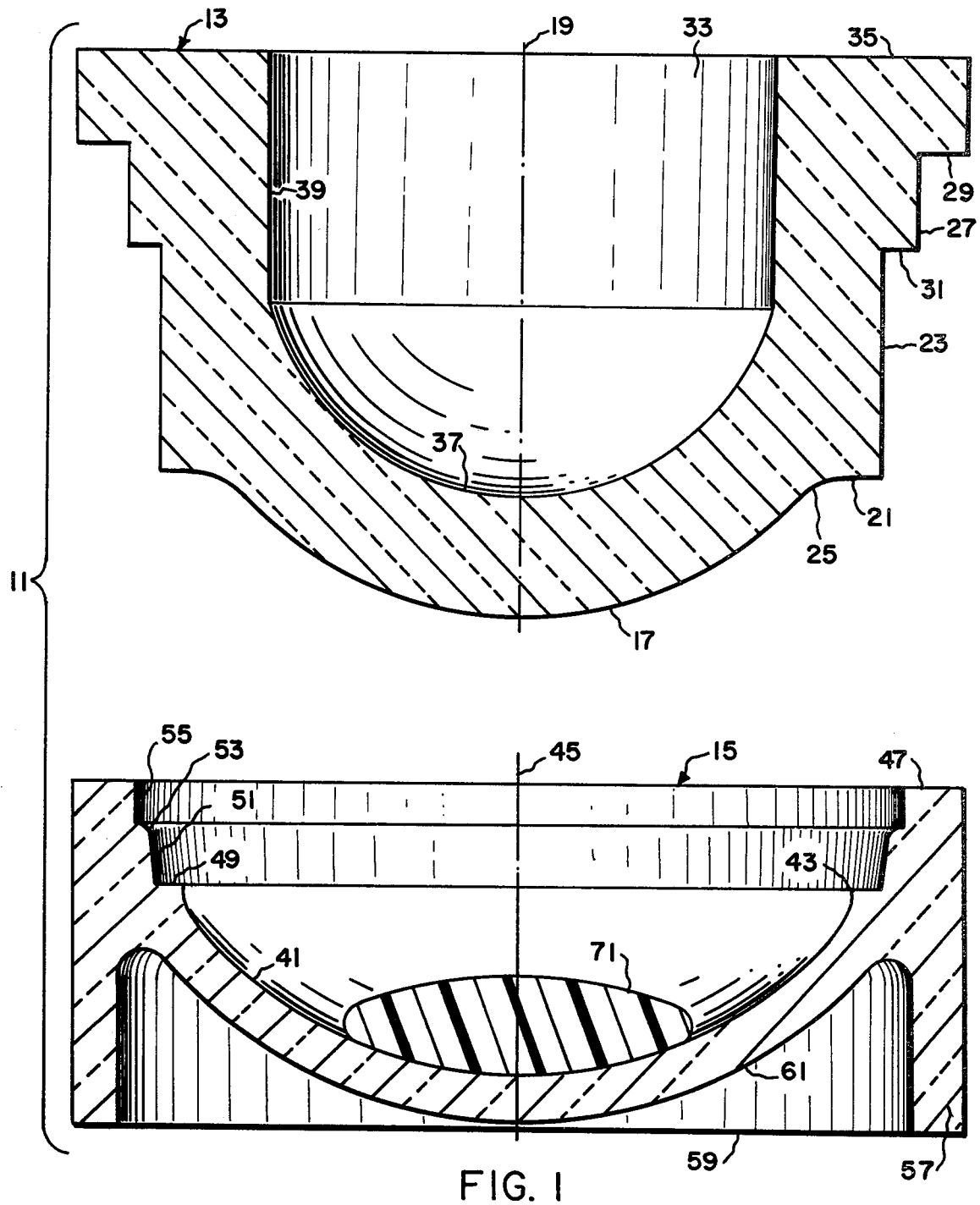
FIG. 1 is an exploded, sectional view of one embodiment of the lens mold of the invention.
Figure 2:
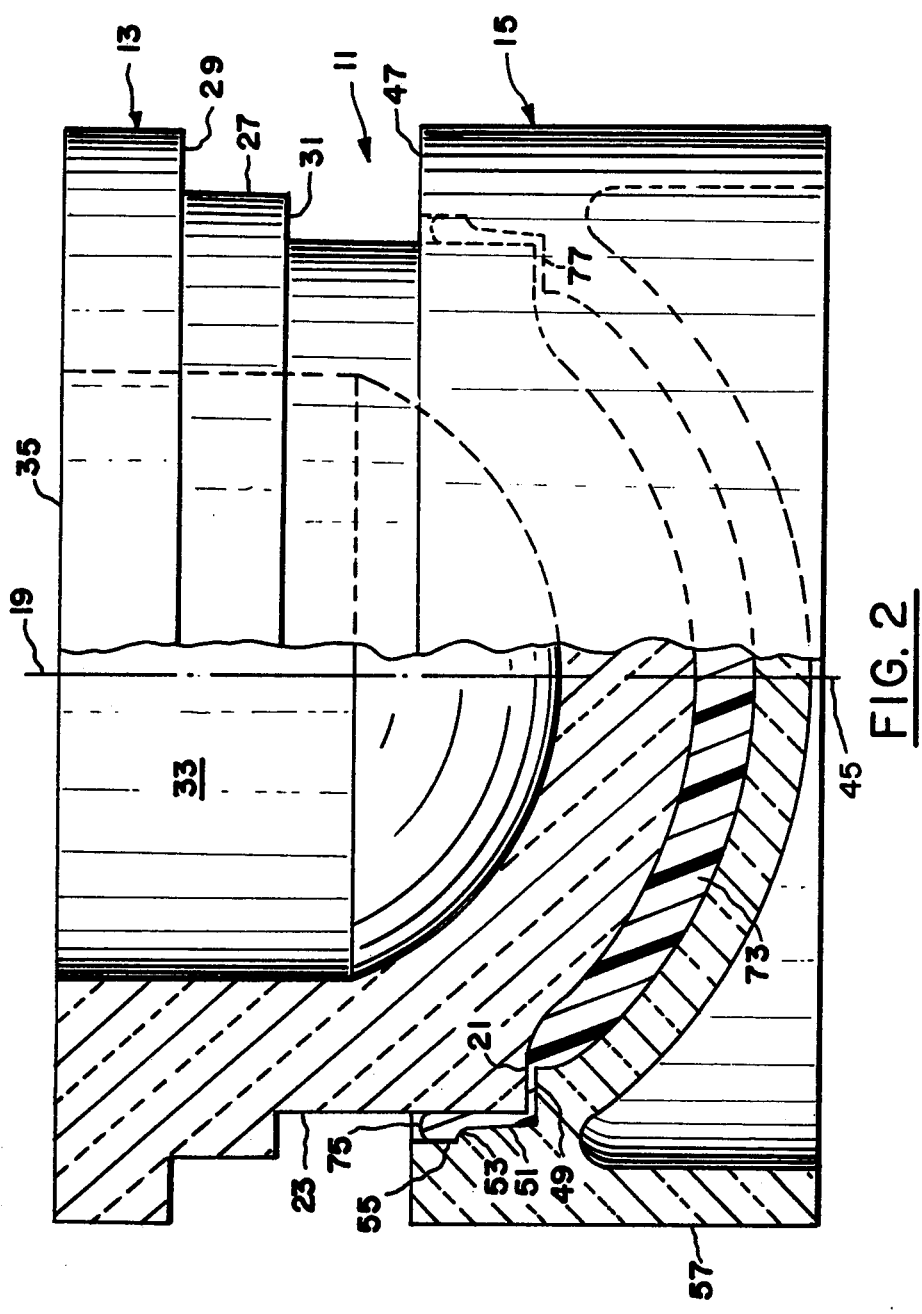
FIG. 2 is a partial sectional view illustrating the mold halves of FIG. 1 in their assembled position.

Lens mold 11 illustrated in FIGS. 1 and 2 includes a male member 13 and a cooperating female member 15. Male member 13 includes a convex surface 17 which has an optical finish and is symmetrical with respect to longitudinal axis 19. Male member 13 also includes a pair of surfaces 21 and 23. Surface 21 conveniently lies in a plane which is perpendicular to axis 19. Surface 23 is, also conveniently, in the form of a section of a cylindrical surface that is concentric with respect to axis 19. As viewed in cross section, surface 21 is smoothly blended into surface 17 via a short radius surface 25. Male member 13 also includes a second pair of surfaces 27 and 29 that are accurately reference with respect to mold surface 17 and axis 19. Thus, in this embodiment, surface 27 is in the form of either a section of a cylinder which is symmetrical with respect to axis 19, or a section of a cone which is symmetrical with respect to axis 19. If a cone, the angle of inclination with respect to axis 19, when viewed in cross section, is very small. Surface 29 lies, most conveniently, in a plane which is perpendicular to axis 19. It should be noted that surfaces 23 and 27 are interconnected by an additional surface 31 which, although illustrated as lying in a plane perpendicular to axis 19, may take any one of a wide variety of contours, such as being the section of a cone. Finally, male member 13 also includes a cavity, designated 33, that extends from surface 35 and is defined by a concave surface 37 and a cylindrical surface 39 both of which are, at least, approximately symmetrical with respect to axis 19.

Female member 15 is provided with a concave mold surface 41 which, when lens mold 11 is used in the production of finished cast lenses, will be optically finished. As illustrated, mold surface 41 terminates at edge 43; is symmetrical with respect to longitudinal axis 45; and is connected with top surface 47 by a plurality of surfaces 49, 51, 53 and 55. Surfaces 47 and 49 lie in planes which are perpendicular to axis 45. Further, both have the outline of an uninterrupted annulus. Surface 51 is the section of a cylindrical taper or cone having its smallest diameter at its juncture with surface 49. Surface 55, though illustrated as a section of a cylinder, may have any suitable configuration. Surface 53, of arcuate cross-sectional configuration, interconnects surfaces 51 and 55. Female member 15 is also provided with a cylindrical extension 57. Extension 57 includes a lower surface 59 that, preferably, lies in a plane which is perpendicular to axis 45 and which, as viewed in FIGS. 1 and 2, lies slightly below exterior surface 61 so as to form a suitable base.

In operation, female member 15 is placed in an upright position as illustrated in FIG. 1 and a quantity of lens material 71 is deposited on surface 41. Male member 13 is then moved relative to female member 15 to form lens mold cavity 73. The fact that surface 51 has the configuration of a section of a cone facilitates the assembly of the two mold halves. Specifically, as male member 13 and female member 15 are brought into their assembled position surface 17 contacts lens material 71 and forces it outward to fill mold cavity 73. That portion of lens material 71 which is in excess of the volume of cavity 73 is collected in the continuous annular reservoir 75 that is formed by surface 53 and by portions of surfaces 23, 51 and 55. Although the filling of mold cavity 73 and the loading of annular reservoir 75 are not accomplished simultaneously, it should be appreciated that both are accomplished by the single step of moving male member 13 into its assembled position relative to female member 15.

As is shown in exaggerated form in FIG. 2, surface 21 is not in direct contact with surface 49 but is separated therefrom by a thin film of lens material 71. Similarly, though the diameter of the cylinder defined by surface 23 and the lower diameter of surface 51 are dimensioned so that they substantially align axes 19 and 45, they are also separated from each other by a thin film of lens material 71 which, by filling the gap between surfaces 23 and 51, acts to hydrostatically align axes 19 and 45 to minimize prism between mold surfaces 17 and 41 and, consequently, between the surfaces of the finished cast lens. The net result of the foregoing assembly operation is that reservoir 75 is open to the fluid environment which surrounds mold 11 and to mold cavity 73 via a circumferentially extending restriction 77. Additionally, it should be noted that reservoir 75 and circumferentially extending restriction 77 serve to seal mold cavity 73 from the fluid environment in which assembled mold 11 is located.

In the case where lens mold 11 is dimensioned for use in manufacturing contact lenses (either corneal or schleral) from, for instance, cross-linked hydrophilic polymers, a spacing of 0.0002 to 0.0005 inches between surface 23 and the lower diameter of surface 51 is utilized. The spacing or gap between surfaces 21 and 49 is also in the same range.

The dimensions set forth in the above example are merely illustrative. It has been found that the width of restriction 77 must be sufficiently large so that lens material in reservoir 75 may be drawn therethrough and into mold cavity 73 to fill the void created therein as the original volume of lens material in mold cavity 73 shrinks during the polymer forming reaction. The spacing between, for instance, surfaces 21 and 49 and, hence, the size of restriction 77 will depend upon such factors as the size and shape of the lens being cast, the weight of male member 13, the viscosity of the lens material used and the rate of polymerization desired. The faster the polymerization rate, the greater the spacing between surfaces 21 and 49 and the larger the size of restriction 77. The fact that, during the polymer forming reaction, the polymer tends to pull the mold halves together must also be taken into consideration.

Clamping pressure, such as set forth in U.S. Pat. No. 3,222,432 or the prior art described therein, is not only not required but would effectively seal reservoir 75 from mold cavity 73 and thus defeat the purpose of having such a reservoir.

The illustrated configuration of the cooperating surface pairs 21, 23 and 49, 51 is one of the preferred arrangements for positioning mold surface 17 in its proper orientation with respect to mold surface 41 and for defining restriction 77. However, it will be evident to those skilled in the art that other cooperating surface configurations provided on each of the mold members would be acceptable for the same purpose as long as the required spacing, alignment and restriction size are achieved. Thus, for instance, each of the surface pairs 21, 23 and 49, 51 could be replaced by a single surface having the configuration of a section of a cone. A surface having, in cross-section, an arcuate configuration would also be possible. Regardless of the configuration it should be realized that the width of, in the illustrated example, restriction 77 must be taken into account in the design of members 13 and 15 so as to achieve the desired spacing between mold surfaces 17 and 41 and, hence, the thickness of the lens. It should also be noted that in those instances where the mold members are provided with nonsymmetrical aspherical surfaces such mold members will have to be keyed to each other to insure that the mold surfaces are properly oriented.

Figure 3:
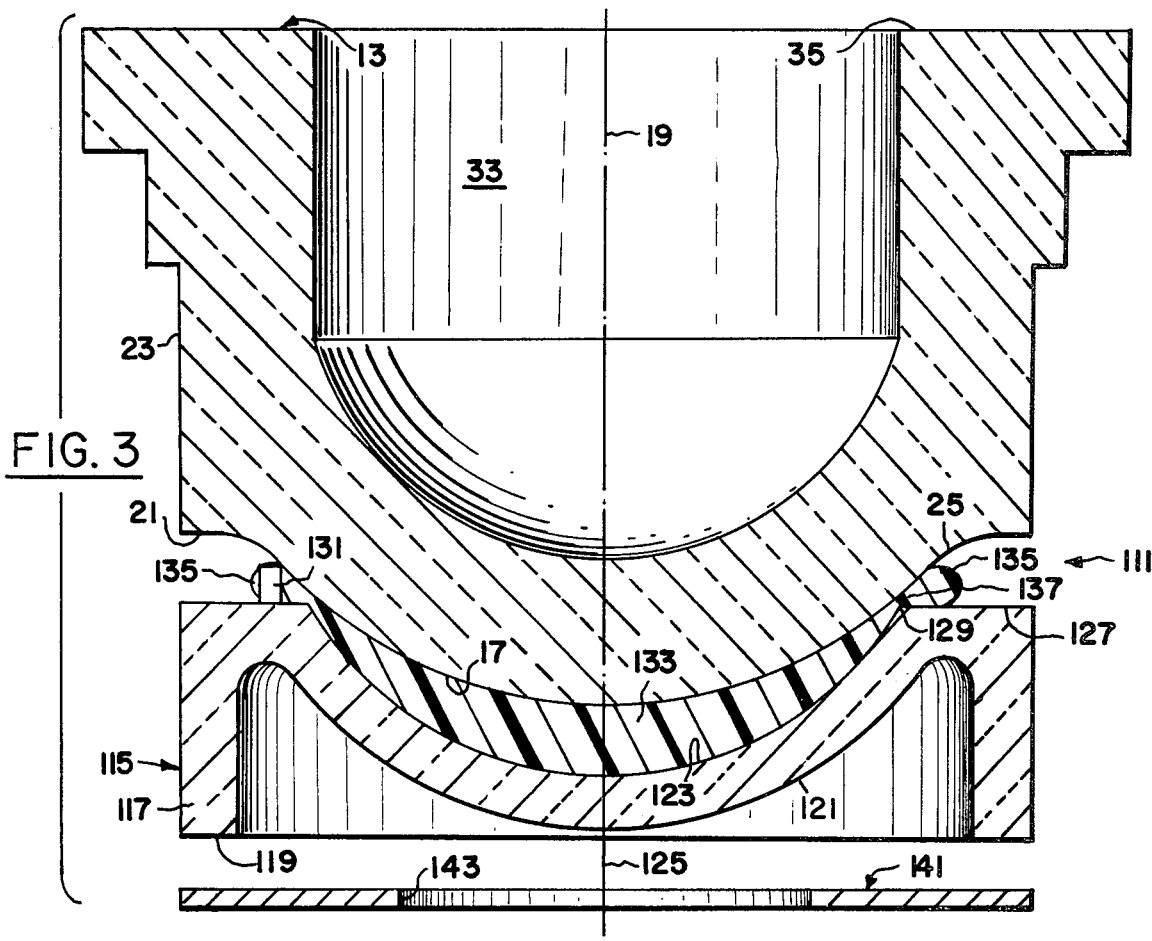
FIG. 3 is a sectional view illustrating an alternate embodiment of the lens mold.
Figure 4:
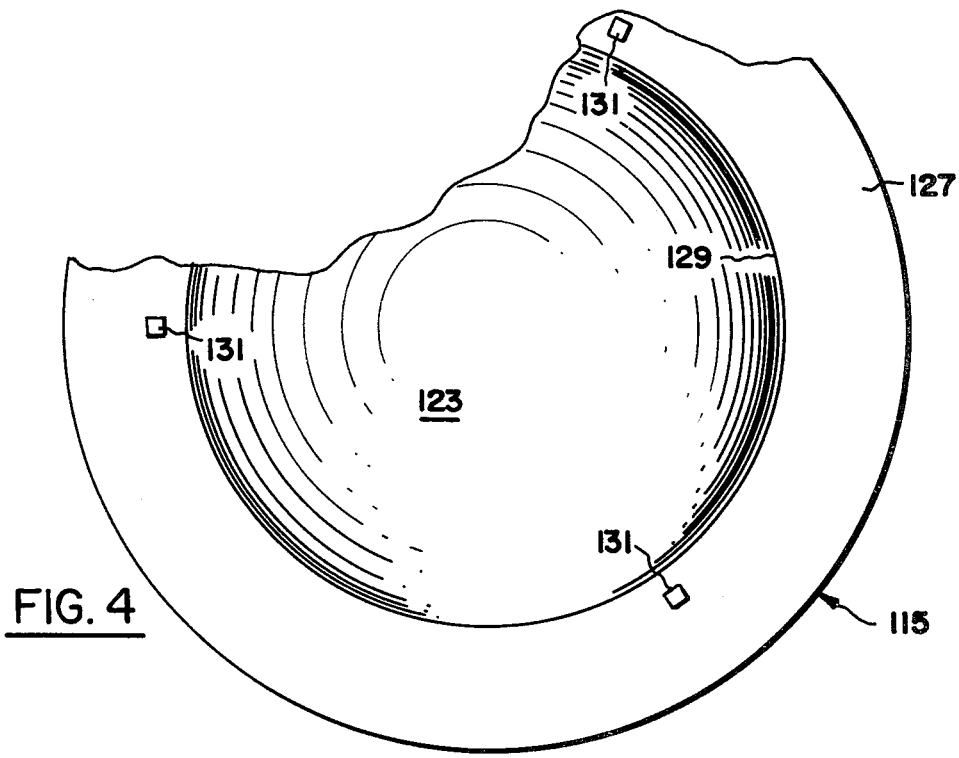
FIG. 4 is a top plan view of the female mold member illustrated in FIG. 3.

The arrangement illustrated in FIG. 2, wherein the width of restriction 77 is determined by the weight of male member 13 and the viscosity of the lens material utilized, etc., is not the only way of maintaining the mold halves in the desired position and obtaining the desired restriction. An alternate system is illustrated in FIGS. 3 and 4. In this second embodiment lens mold 111 comprises male member 13 and female member 115. Female member 115 includes a cylindrical extension 117, a lower surface 119 and an exterior mold surface 121 which are substantially the same as, respectively, extension 57 and surfaces 59 and 61 of female member 15. Female mold member 115 also includes a mold surface 123 that is symmetrical with respect to axis 125 and a top surface 127 which, in conjunction with mold surface 123, forms edge 129. Mold surface 123 may be optically finished. Further, surface 127 is provided with a plurality of upstanding projections 131 that are symmetrical about axis 125 and, preferably, are outwardly spaced from edge 129. While the illustrated embodiment includes only three projections 131 it will be appreciated that additional projections may be provided.

In operation, as with the previous embodiment, a quantity of lens material is deposited upon mold surface 123. Male member 13 is then moved relative to female member 115 until mold surface 17 engages projections 131 and forms, as illustrated in FIG. 3, mold cavity 133. Although, in FIG. 3, axes 19 and 125 are illustrated as being coincident, it will be appreciated that so long as a mold surface 17 is spherical and is in engagement with all of projections 131, axis 19 need not be aligned with axis 125 in order for mold cavity 133 to be symmetrical about axis 125.

In a manner similar to the previous embodiment, as male member 13 and female member 115 are brought into their assembled position, surface 17 contacts the lens material and forces it outward to fill mold cavity 133. That portion of the lens material which is in excess of the volume of mold cavity 133 is collected in annular reservoir 135 which is separated from and connected to mold cavity 133 by an annular restriction 137. Reservoir 135 is defined by surface 127 of female member 115 and by surfaces 21 and 25 and a portion of surface 17 of male member 13. Surface tension holds the lens material in reservoir 135 in approximately the position illustrated in FIG. 3.

With the embodiment illustrated in FIGS. 3 and 4 the height of projections 131 above surface 127 and hence the size of restriction 137 will depend upon the same factors that determine the size of restriction 77. That is, the size of restriction 137 must be sufficiently large so that lens material in reservoir 135 may be drawn therethrough and into mold cavity 133 to fill any voids created therein as the original volume of monomer shrinks during the polymer forming reaction.

In the case of contact lenses manufactured of, for example, cross-linked hydrophilic polymers, the weight of the male member 13 is sufficient to hold mold surface 17 in engagement with projections 131.

After the mold cavity and the reservoir have been filled, the lens material in the mold cavity is polymerized while the lens material in the reservoir is inhibited from polymerizing. As used in this specification the term "polymerize" (and its various tenses) means a polymer forming reaction in which the polymer is prepared by: (1) the polymerization of suitable monomers, obligomers and/or prepolymers; or (2) a cross-linking reaction.

The specific details of polymerizing in the mold cavity; of keeping the lens material in the reservoir in a flowable state longer than the lens material in the mold cavity; and the material from which the mold is made will vary depending on the particular lens material selected and the manner of initiating the polymer forming reaction. Heat or other forms of radiation such as ultraviolet light may be utilized. The fluid environment to which the lens material in the reservoir is exposed may be an inert one, such as nitrogen, or may be one which inhibits polymerization without contaminating such lens material. Additionally, depending upon the nature and intensity of the radiation, it may be necessary to shield the reservoir from the particular radiation used to polymerize the lens material in the mold cavity. Finally, the material from which the mold halves are formed must be one which is inert to the particular lens material selected and which permits the desired form of polymer forming reaction.

As has been previously stated, the embodiments illustrated in, respectively, FIGS. 1 and 2 FIGS. 3 and 4 may be used to form contact lenses of hydrophilic material such as disclosed in U.S. Pat. Nos. 2,976,576 and 3,220,960. With regard to such materials it is noted that oxygen in the air acts as an inhibitor without contaminating the material. Thus, by exposing that portion of the lens material that is in the reservoir to air, it will, at least for low levels of radiation, be inhibited from polymerizing and thus remain in its fluid condition.

It should be appreciated that the polymerization of the lens material should proceed from the center of the mold outwards in order to avoid polymerizing that portion of the lens material in the mold which is adjacent the edge of the mold cavity and, consequently, blocking off the reservoir from the center section of the mold cavity. One expeditious way of avoiding the foregoing problem is to polymerize the lens material with, for instance, ultra violet radiation while using a diaphragm such as schematically illustrated at 141 in FIG. 3. In the case of a symmetrical lens, it has been determined that diaphragm 141 may, most simply, be an opaque screen having a circular opening 143 therein. The diameter of opening 143 should be smaller than the diameter of the lens being cast in order to insure that the lens material adjacent to the edge of the mold is shielded from the radiation. In operation, once the lens material in the center of the mold cavity has been polymerized, diaphragm 141 is removed to permit polymerization of the lens material adjacent to the edge of the mold. Alternately, a diaphragm with an adjustable opening may be utilized. When using a diaphragm it is preferred that the direction of radiation should be approximately parallel to, in the embodiment illustrated in FIG. 3, axis 125. As is evident from U.S. Pat. No. 3,408,429 the mold halves in this instance may be made from glass or suitable plastics which are inert to the polymerizable material and which permit the transmission of the ultra violet radiation.

The position of diaphragm 141 in FIG. 3 is merely illustrative. This diaphragm and, of course, the source of radiation may just as easily be positioned above male member 13 during the polymer forming reaction. Further, although the use of diaphragm 141 is preferred it has been found that, with the lens material in either the reservoir 75 or 135 exposed to air and with low levels of radiation, the configuration of exterior surfaces 61 and 121 of female mold members 15 and 115 is such that the center section of mold cavities 73 and 133 receive more radiation than the edge portions thereof. The configuration of male member 13 produces a similar result.

In the foregoing example the surface of the lens material in the reservoir is inhibited from polymerizing because of the fact that such material is exposed to air. However, for convenience in later handling, it is preferred that after the lens material within the mold cavity has been polymerized, any uncured lens material remaining in the reservoir also be polymerized. This may be accomplished by placing the mold in a nitrogen or other inert gas environment and subjecting the remaining reservoir material to ultra violet radiation.

The quantity of lens material necessary will depend upon the size of the lens to be cast and the volume change which such lens material undergoes as it is cured. Thus, for example, the amount of lens material 71 deposited upon surface 41 will equal the volume of the lens to be cast plus a volume slightly in excess of the amount required to compensate for shrinkage as this material cures. For any given mold cavity, this amount may readily be determined by routine experimentation. If a test run indicates that the reservoir is drained during the polymer forming reaction the inject volume is simply increased. It should be appreciated, however, that there is no critical inject volume such as is required for the manufacture of contact lenses by the process disclosed in U.S. Pat. No. 3,408,429.

It should also be noted that the process is not restricted to those situations where lens material flows only from the reservoir into the mold cavity. With regard to allyl diglycol carbonate, for instance, it should be noted that as this material is heated during the polymerizing or curing process it undergoes a temporary expansion. In this situation the reservoir serves as a catch basin to collect and hold the initially expelled material. Molds 11 and 111 may thus be used in molding lenses from suitable lens materials that undergo permanent expansion upon curing. The existence of a monomer which expands on polymerization is disclosed in the article "Polymerization of a Spiro Ortho Carbonate with Expansion in Volume" by W. J. Bailey and H. Katsuki, Polymer Preprints, American Chemical Society, Volume 14 (2), pages 1169-1174, August, 1973. In this last situation the mold halves 13 and 15 must be held together by force sufficient to prevent them from separating but insufficient to seal the mold cavity from the reservoir. The presence of projections 131 on female member 115, insures that the force necessary to prevent members 13 and 115 from separating will not seal reservoir 135 from mold cavity 133. In view of the foregoing it will also be evident that, as with the case where the lens material shrinks upon curing, the amount of lens material deposited on surface 41 or 123 does not have to be exactly determined.

After the polymer forming reaction has been completed male and female members (either 13 and 15 or 13 and 115) are separated from each other leaving a finished lens of the desired thickness and having convex and concave surfaces of the prescribed contour. As those skilled in the art will appreciate, the mold member to which the cured lens will adhere depend upon the materials from which the mold members are made. Thus, by fabricating the male and female mold members of materials which, while both wettable, have different degrees of wettability, one can insure that the cured lens material will adhere to the desired mold half upon separation. Further, if both mold members are of the same material, adherence to one mold member or the other can be assured by mechanical means such as the configuration of mold members and/or by knurling selected surface areas of one or the other mold members.

In the case where the lens as cast has the desired curvatures and finish and where such lens adheres to the the female mold member, the flash which is formed by the polymerizing of the lens material in the reservoir and/or restriction, may conveniently be removed by apparatus such as illustrated in U.S. Pat. No. 3,835,596. Since such apparatus is adapted to edge a lens while it is secured to a female mold member it is preferable that the flash also remain with, for instance, female member 115 rather than stick to male member 13. This may be further assured by, for example, knurling or roughening surface 127 of female member 115.

Figure 5:
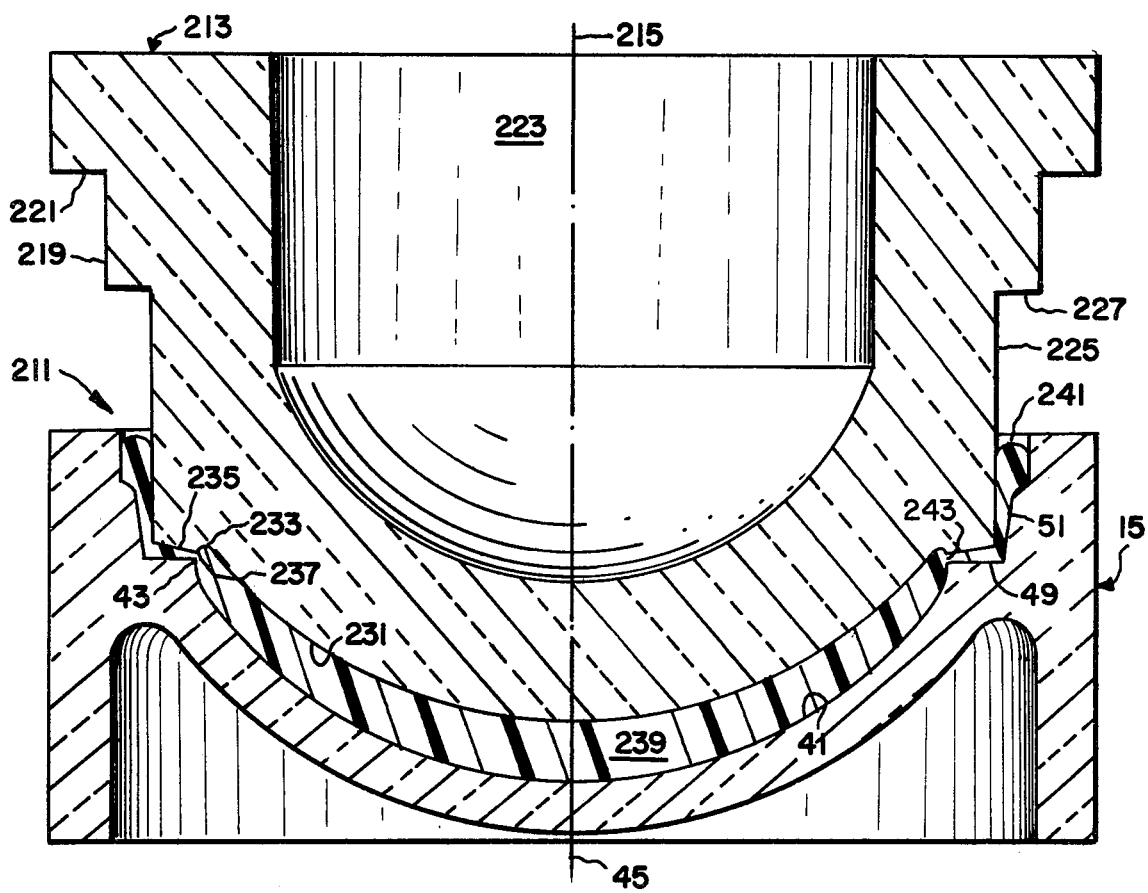
FIG. 5 illustrates, in sectional view, a modified male mold member in combination with the female mold member of FIGS. 1 and 2.

It will be evident to those skilled in the art that numerous changes may be made in the details of either lens mold 11 or lens mold 111. One such modification is illustrated in FIG. 5. In this embodiment lens mold 211 includes female member 15 and male member 213. Male member 213 includes a longitudinal axis 215, surfaces 219, 221 and cavity 223 all of which are identical to, respectively, longitudinal axis 19, surfaces 27, 29 and cavity 33 of male member 13. Male member 213 also includes surfaces 225 and 227 which are, respectively, of the same configuration as surfaces 23 and 31. However, male member 213 differs from the previous embodiment in that lens mold surface 231 includes a recessed portion 233 which forms with tapered surface 235 an edge 237. With male half 213 assembled with female half 15, surface 225 is received within surface 51 so, in conjunction with an appropriately selected lens material, as to align axes 215 and 45 and form mold cavity 239 and reservoir 241. With cavity 239 filled and reservoir 241 loaded with the selected lens material, edge 237 is in opposing relation to but separated from edge 43 by a thin layer of lens material which is exaggerated for purposes of illustration. Operationally, mold 211 functions in the same manner as molds 11 and 111. Edges 43 and 237 thus cooperate to define annular restriction 243.

Figure 6:
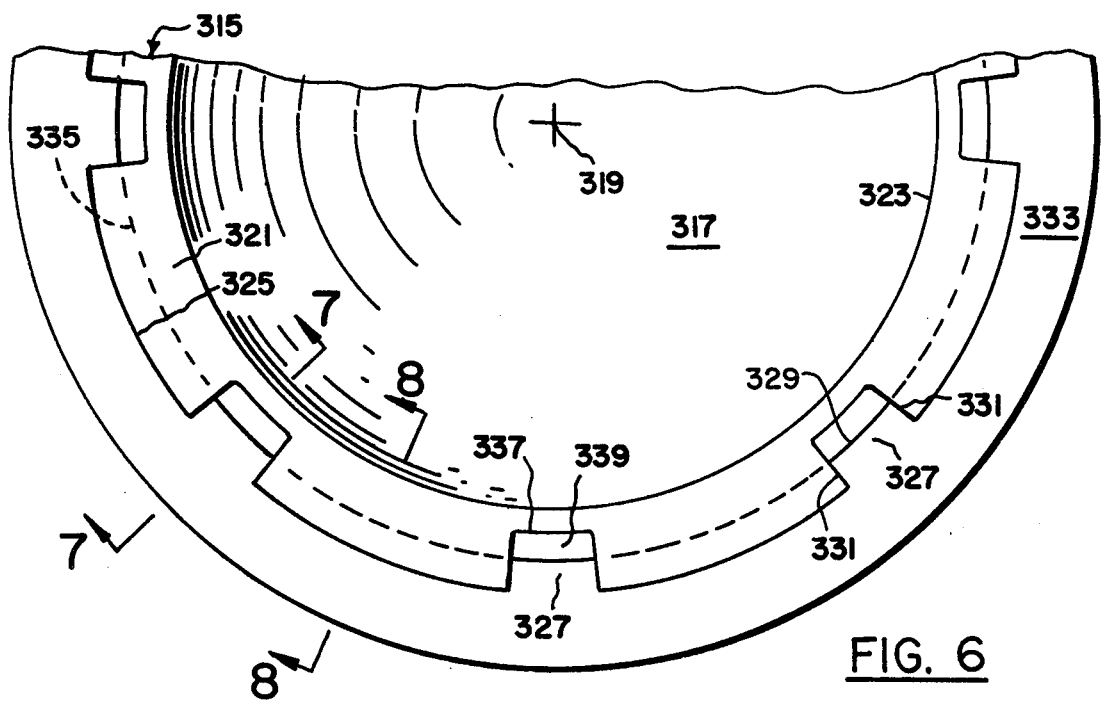
FIG. 6 is a top plan view of a modified female mold half for use in conjunction with, for instance, the male mold half of FIGS. 1 and 2.
Figure 7:
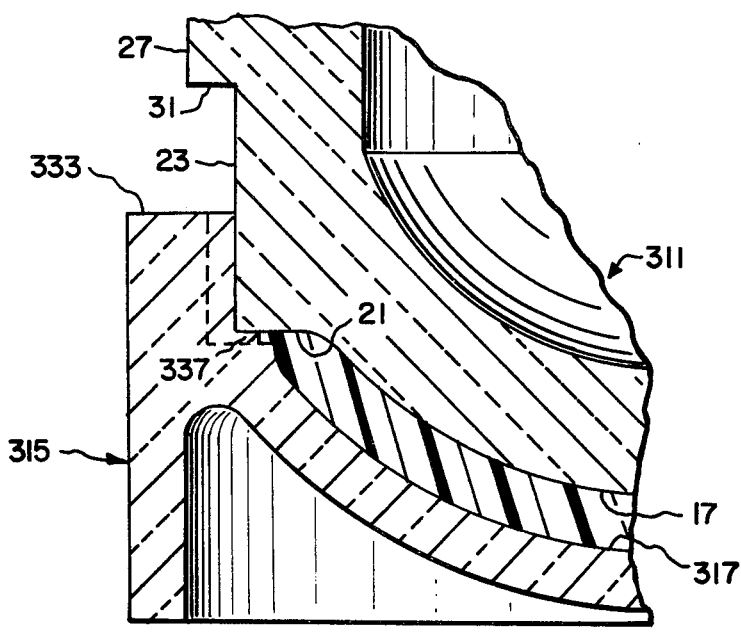
FIG. 7 is a partial sectional view of the mold of FIG. 6, taken along line 7—7 thereof, in combination with the male mold member of FIGS. 1 and 2.
Figure 8:
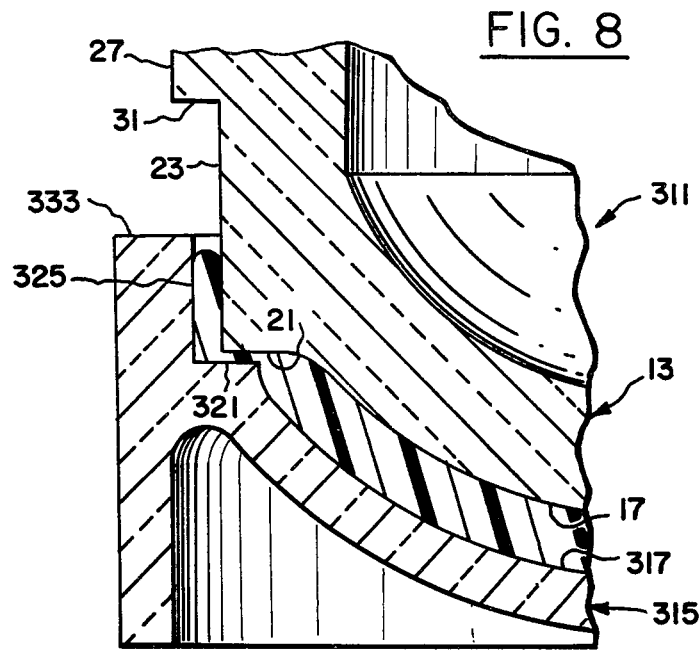
FIG. 8 is a partial sectional view of the mold of FIG. 6, taken along line 8—8 thereof, in combination with the male mold member of FIGS. 1 and 2.

FIGS. 6, 7 and 8 illustrate lens mold 311 formed of alternate female member 315 and male member 13. Alternately, female member 315 may be combined with male member 213. Female member 315 includes mold surface 317 which is illustrated as being symmetrical with respect to the longitudinal axis 319. Female member 315 also includes a surface 321 that is similar to surface 49 of female member 15. Surface 321 extends from edge 323 outward to a series of surface segments 325 interconnected by projecting elements 327. Each projecting element 327 includes an inwardly facing surface 329 and lateral faces 331 all of which extend upward from surface 321 to top surface 333. Surfaces 329 lie in an imaginery cylindrical surface, indicated by broken line 335, that is symmetrical with respect to axis 319. Further, the distance between opposing surfaces 329 is dimensioned so as to (when female part 315 is assembled with, for instance, male part 13) snuggly receive surface 23 and, consequently, align axes 319 and 19 to minimize prism in the lens to be cast. Finally, in order to control the spacing between mold surfaces 17 and 317, the base of each projecting element 327 includes, as illustrated in FIGS. 6 and 7, an inwardly extending foot 337. Each foot 337 includes a surface 339 adapted to, in the case of male portion 13 and as illustrated in FIG. 7, engage surface 21 to thereby control lens thickness.

In operation female portion 315 functions in the same manner as female portion 15. However, when assembled with, for instance, male portion 13 a series of reservoirs (such as illustrated in cross-section in FIG. 8) in the form of a segmented annulus, as opposed to a continuous reservoir, will surround and be open to the mold cavity. Each of these reservoirs is defined by a surface segment 325, opposing lateral faces 331, portions of surface 321 and portions of surface 23 of male member 13. A continuous annular restriction will interconnect the several reservoirs with the mold cavity.

Figure 9:
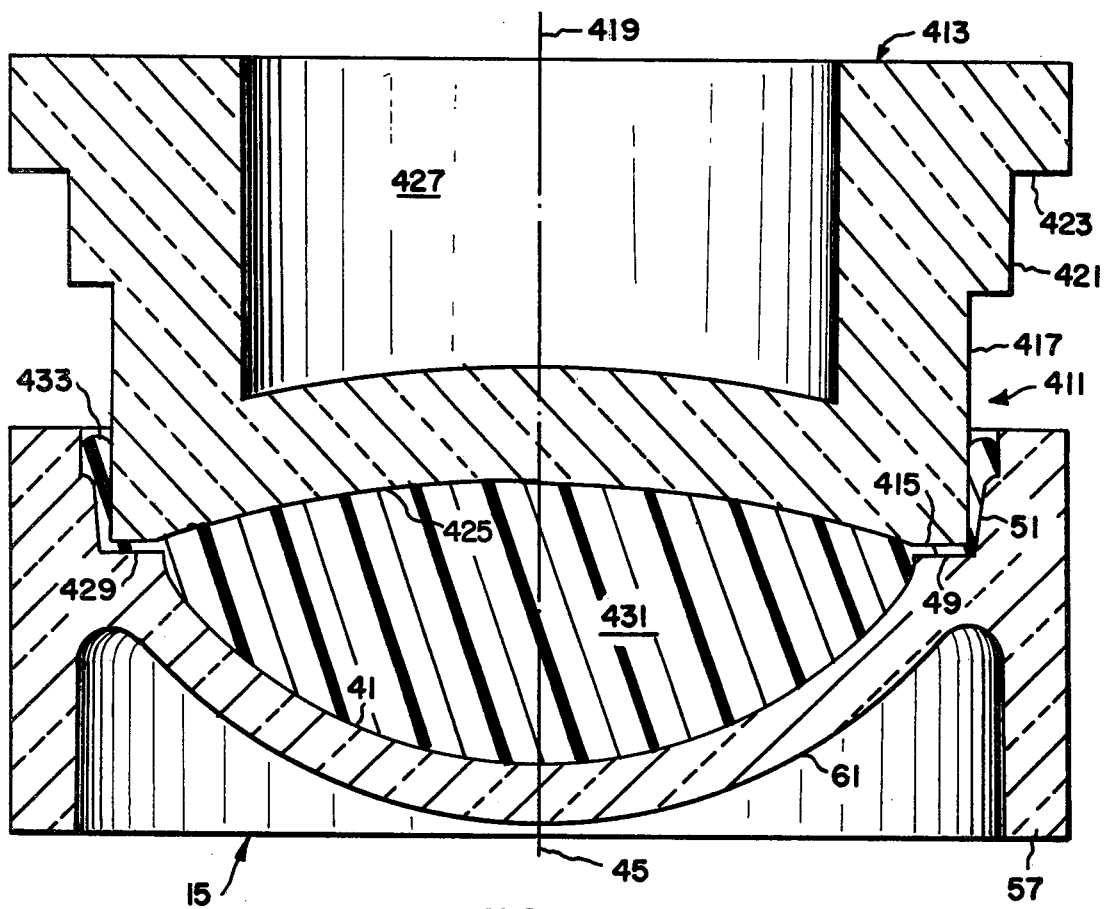
FIG. 9 is a sectional view of an alternate embodiment of the lens mold of the present invention.

FIG. 9 illustrates alternate mold assembly 411 formed of male member 413 and female member 15. Male member 413 is the same as the male member 13 insofar as it includes surfaces 415 and 417 which correspond to surfaces 21 and 23 and which, in conjunction with the selected lens material, function to align axis 419 with axis 45 of female mold member 15 in the manner described in connection with the embodiments of FIGS. 1 and 2. Male member 413 is also the same as the male member 13 insofar as it includes surfaces 421 and 423 which correspond to surfaces 27 and 29. Male member 413 differs from mold half 13 in that it is provided with concave mold surface 425 which, most conveniently, is symmetrical with respect to the axis 419. A modified cavity 427 is also provided.

In operation mold 411 functions in the same manner as mold 11. Opposing surfaces 49 and 415 cooperate to define restriction 429 which interconnects mold cavity 431 with reservoir 433. Thus, when used with allyl diglycol carbonate, such monomer will be drawn from reservoir 433 into mold cavity 431 (as the original volume therein shrinks during the polymer forming reaction) due to the vacuum formed within mold cavity 431 and the pressure of the atmosphere exerted on the exposed monomer in reservoir 433. It will be appreciated that female member 315 may also be utilized with male member 413 in place of member 15.

As those skilled in the art will appreciate, machining may be utilized with the lenses cast using mold 11, 111, 211, 311 or 411 if it is desired to minimize the required inventory of, particularly, a series of female mold members each having a mold surface of different curvature. For this purpose, surfaces 27 and 29 are accurately referenced to axis 19 and mold surface 17. Similarly, surfaces 219 and 221 are accurately referenced to axis 215 and mold surface 231 and surfaces 421 and 423 are accurately referenced to axis 419 and surface 425. Thus, in those instances where the cured lens material adheres to the male mold member and lens material is to be mechanically removed, surfaces 27, 29 or surfaces 219, 221 or surfaces 421, 423 serve as machine reference surfaces to accurately position the lens during machining. In the case of production of symmetrical lenses such as system minimizes prism between the cast and the machined surface of the lens.

Figure 10:
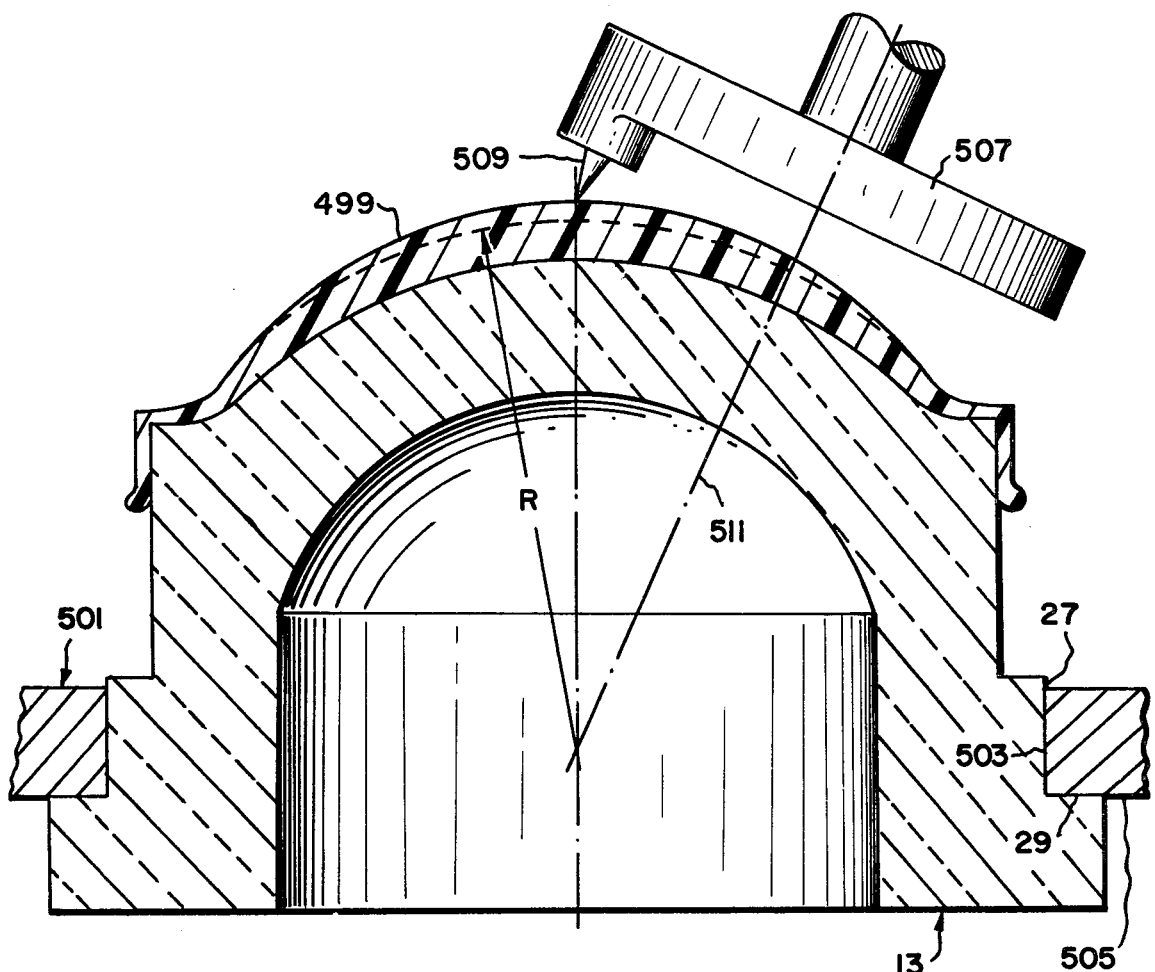
FIG. 10 is a view, partially schematic and partially in section, illustrating machinery for contouring one of the lens surfaces.

The surface generating apparatus illustrated in FIG. 10 includes a rotatable spindle (not illustrated) having a centering ring 501 which snuggly receives surface 27 within opening 503 so as to align axis 19 with the axis of rotation of the spindle. Further, mold surface 17 and lens 499 secured thereto are properly aligned in the axial direction by the abutting of surface 29 with surface 505 of centering ring 501. The surface generating machine also includes a rotating cutter head 507 having a fly cutter 509. As with standard generating apparatus, head 507 rotates about axis 511 which intersects the axis of rotation of centering ring 501 (which coincides with axis 19) at the radius, designated R, of the curve to be generated on the convex side of lens 499.

In view of the foregoing, it will be appreciated that, as used in this specification, the term "lens" includes lenses which are cast in the final desired shape (except for edging) as well as semi-finished lens blanks.

Finally, it should be noted that while the foregoing embodiments illustrate molds designed for the production of symmetrical lenses those skilled in the art will appreciate that the disclosed process is equally suited to the production of aspherical surfaces and surfaces other than surfaces of revolution. Those skilled in the art will also appreciate that bifocal lenses can be produced by the insertion in the mold cavity of a suitable insert having an index of refraction different from that of the selected lens material or by forming the mold surfaces in the manner suggested by U.S. Pat. No. 3,297,422.

Whereas the drawings and accompanying description have shown and described several preferred embodiments of the present invention, it should be apparent to those skilled in the art that various changes may be made in the form of the invention without affecting the scope thereof.

What we claim is:

1. A method of forming a lens from first and second mold members, said first mold member having a first longitudinal axis and a first mold surface referenced with respect to said first longitudinal axis, said second mold member having a second longitudinal axis and a second mold surface referenced with respect to said second longitudinal axis, said mold surfaces cooperating to define a mold cavity having a center section and an edge portion, said mold members defining, when said second mold member is assembled with said first mold member, an annular reservoir surrounding said mold cavity and connected to said mold cavity by an annular restriction, said annular restriction being defined by first and second axial spacing means and first and second radial alignment means located on said first and second mold members between said reservoir and said mold cavity, said method comprising:

(a) orientating said first mold member so that said first mold surface will retain polymerizable material;
(b) depositing on said first mold surface a volume of polymerizable material in excess of the volume of the lens to be formed;
(c) moving said second mold member into position relative to said first mold member to form both said mold cavity and said annular reservoir, said second mold surface contacting said polymerizable material on said first mold surface to force said polymerizable material outward to:
  (1) fill said mold cavity with a portion of said polymerizable material;
  (2) space both said first axial spacing means from said second axial spacing means and said first radial alignment means from said second radial alignment means by a layer of polymerizable material to form said restriction and to both axially position said first mold surface relative to said second mold surface and hydrostatically align said axis; and
  (3) load said reservoir with that portion of said polymerizable material which is in excess of the volume of said mold cavity and said restriction; and
(d) polymerizing said polymerizable material in said mold cavity from said center section of said mold cavity to said edge portion of said mold cavity.

2. The method as set forth in claim 1 further including the steps of:
(a) providing machine referencing means on one of said first and second mold members;
(b) disengaging said first and second mold members so as to leave the polymerized material adhering to said one of said first and second mold members;
(c) providing a contouring apparatus including a cutting means and a rotatable chuck provided with a centering means;
(d) positioning said polymerized material relative to said cutting means by engaging said machine referencing means with said centering means;
(e) rotating said chuck; and
(f) engaging said cutting means with said polymerized material to remove selected portions thereof.

3. The method as set forth in claim 1 wherein said polymerization step is accomplished by subjecting said center section of said mold cavity to a greater quantity of polymerization including radiation than said edge portion of said mold cavity.

4. The method as set forth in claim 3 further including the steps of:
(a) providing means for shielding said edge portion of said mold cavity;
(b) directing polymerization inducing radiation onto said center section of said mold cavity and said shield means until said polymerizable material in said center section of said mold cavity is at least partially cured; and
(c) removing said shield means to thereby permit said radiation to polymerize said polymerizable material in said edge portion of said mold cavity.

5. The method as set forth in claim 4 further including the steps of:
(a) providing machine referencing means on one of said first and second mold members;
(b) disengaging said first and second mold members so as to leave the polymerized material adhering to said one of said first and second mold members;
(c) providing a contouring apparatus including a cutting means and a rotatable chuck provided with a centering means;
(d) positioning said polymerized material relative to said cutting means by engaging said machine referencing means with said centering means;
(e) rotating said chuck; and
(f) engaging said cutting means with said polymerized material to remove selected portions thereof.

* * * * *